US008908336B2

(12) United States Patent
Cullen et al.

(10) Patent No.: US 8,908,336 B2
(45) Date of Patent: Dec. 9, 2014

(54) FAULT TOLERANT ELECTRICAL MACHINE

(75) Inventors: John James Anthony Cullen, Derby (GB); Stephen Andrew Long, Carmel, IN (US)

(73) Assignee: Rolls-Royce PLC, London (GB)

( * ) Notice: Subject to any disclaimer, the term of this patent is extended or adjusted under 35 U.S.C. 154(b) by 244 days.

(21) Appl. No.: 13/517,409

(22) PCT Filed: Jan. 5, 2011

(86) PCT No.: PCT/EP2011/050099
§ 371 (c)(1),
(2), (4) Date: Jun. 20, 2012

(87) PCT Pub. No.: WO2011/086019
PCT Pub. Date: Jul. 21, 2011

(65) Prior Publication Data
US 2012/0275068 A1    Nov. 1, 2012

(30) Foreign Application Priority Data

Jan. 13, 2010 (GB) ..................... 1000476

(51) Int. Cl.
*H02H 7/08* (2006.01)
*H02P 29/02* (2006.01)
*H02P 25/22* (2006.01)
(52) U.S. Cl.
CPC .............. *H02P 29/022* (2013.01); *H02P 25/22* (2013.01)
USPC ........ 361/23; 318/700; 318/400.01; 318/701; 322/20

(58) Field of Classification Search
CPC ....... H02P 1/00; B62D 5/0409; B62D 5/0481
USPC ............ 318/400.23, 700, 400.01, 400.3, 701; 361/23; 322/20; 290/31
See application file for complete search history.

(56) References Cited

U.S. PATENT DOCUMENTS 8,395,346 B2 * 3/2013 Trainer et al. ................. 318/700
8,653,797 B2 * 2/2014 Cullen et al. .................... 322/20
2005/0073273 A1    4/2005 Maslov et al.
2009/0302792 A1    12/2009 Osada et al.

FOREIGN PATENT DOCUMENTS

WO    WO 2005/011078 A1    2/2005
WO    WO 2005/041401 A1    5/2005
WO    WO 2009/007671 A2    1/2009

OTHER PUBLICATIONS

May 10, 2010 Search Report in British Patent Application No. GB100476.0.
Oct. 13, 2011 International Search Report issued in International Patent Application No. PCT/EP2011/050099.
Oct. 13, 2011 Written Opinion of the International Searching Authority issued in International Patent Application No. PCT/EP2011/050099.

(Continued)

*Primary Examiner* — Rita Leykin
(74) *Attorney, Agent, or Firm* — Oliff PLC

(57) ABSTRACT

A fault tolerant electrical machine including: a plurality of phases; a detector arranged to detect a fault in at least one of the phases; and a controller arranged to intentionally cause a fault in at least one other of the phases such that the vector sum of the second harmonic power vectors of the remaining phases is zero.

20 Claims, 2 Drawing Sheets

(56) References Cited

OTHER PUBLICATIONS

Mitcham, et al., "Implications of shorted turn faults in bar wound PM machines," *IEEE Proc.—Electr. Power Appl.*, Nov. 2004, pp. 651-657, vol. 151, No. 6, IEEE.

Haylock, "Fault Tolerant Drives for Safety Critical Applications," Jan. 1998, pp. 196-197.

Say; "Uniformly distributed winding;" *Alternating Current Machines $5^{th}$ ed.*; 1983; pp. 95-96.

* cited by examiner

FAULT TOLERANT ELECTRICAL MACHINE

The present invention relates to a fault tolerant electrical machine, and particularly but not exclusively to a fault tolerant electrical machine for use in a gas turbine engine.

In current aerospace applications electrical power is generated using traditional wound-field synchronous electrical machines. These synchronous electrical machines are coupled to a rotor of the gas turbine engine using a complex mechanical transmission system, for example a radial drive shaft from the gas turbine engine rotor and a gearbox. These synchronous electrical machines are mounted on the gas turbine engine in a position where they are readily accessible for maintenance and/or replacement if there is a fault with the synchronous electrical machine.

Alternatively the synchronous electrical machine may be embedded in the gas turbine engine, for example by coupling the rotor of the synchronous electrical machine to the rotor of the gas turbine engine. The advantage of the embedded synchronous electrical machine is that it allows the complex mechanical transmission system to be removed, or greatly simplified, providing significant operational and efficiency benefits. However, these embedded synchronous electrical machines are difficult to remove and replace if there is a fault/failure.

It is desirable to use the synchronous electrical machine to start the gas turbine engine, as well as to generate electricity, as this removes the reliance on an air starter and provides additional engine design benefits. A power electronic interface is provided with the synchronous electrical machine to enable the synchronous electrical machine to act as a motor rather than a generator. In particular the power electronic interface allows the input and output frequencies to be different irrespective of whether the synchronous electrical machine is operating as a motor or a generator. Electrical generator systems utilising power electronic converters enable very high power dense machine technologies, for example permanent magnet designs to be employed in the synchronous electrical machine, which gives further size and weight benefits compared to traditional synchronous electrical machines.

There is a need for high reliability and fault tolerant synchronous electrical machines for aircraft gas turbine engines. Fault tolerance is in part provided by having no magnetic coupling between phases of the machine and by providing an independent power electronic converter for each phase.

Conventionally, if a short-circuit occurs within a phase of a fault tolerant machine, the whole phase is shorted at its terminals. This prevents overheating which could potentially cause a fire. Consequently, a mechanical ripple torque or power and electrical ripple power occur. Such ripples are undesirable and may be smoothed using a rectifier circuit comprising energy storage devices such as capacitors and/or inductors. However, such energy storage devices add size and weight to the system and thus it is desirable to be able to remove them or to at least reduce the magnitude of ripple to allow smaller energy storage devices to be used.

The present invention provides an improved fault tolerant electrical machine which is capable of preventing mechanical and electrical ripple torque or power resulting from a fault.

In accordance with a first aspect of the invention there is provided a fault tolerant electrical machine comprising: a plurality of phases; a detector arranged to detect a fault in at least one of the phases; and a controller arranged to intentionally cause a fault in at least one other of the phases such that the vector sum of the second harmonic power vectors of the remaining phases is zero.

Intentionally causing a fault in at least one other of the phases may include simulating a fault by temporarily modifying the power of the at least one phase so as to mirror the power of the phase in which the fault is detected.

The fault may be a short-circuit.

The controller may comprise a plurality of converters, each phase having a respective converter.

The machine may be a motor/generator.

The machine may be a starter/generator.

The machine may be a synchronous electrical machine.

The machine may comprise a permanent magnet electrical machine.

The machine may comprise a reluctance electrical machine.

The plurality of phases may comprise an even number of phases. The even number of phases may be 4 or a multiple of 4.

The angles of the phases may be evenly distributed around 360° and the angles of the phases in which the fault is detected and in which the fault is intentionally created may be evenly distributed around 360°.

The fault tolerant electrical machine may be used in a gas turbine engine.

In accordance with a second aspect of the invention there is provided a method of operating a fault tolerant electrical machine comprising a plurality of phases, the method comprising: detecting a fault in at least one of the phases; and intentionally causing a short-circuit in at least one other of the phases such that the vector sum of the second harmonic power vectors of the remaining phases is zero.

The fault may be a short-circuit.

For a better understanding of the invention and to show more clearly how it may be carried into effect, reference will now be made, by way of example, to the accompanying drawings, in which:—

Figure 1:
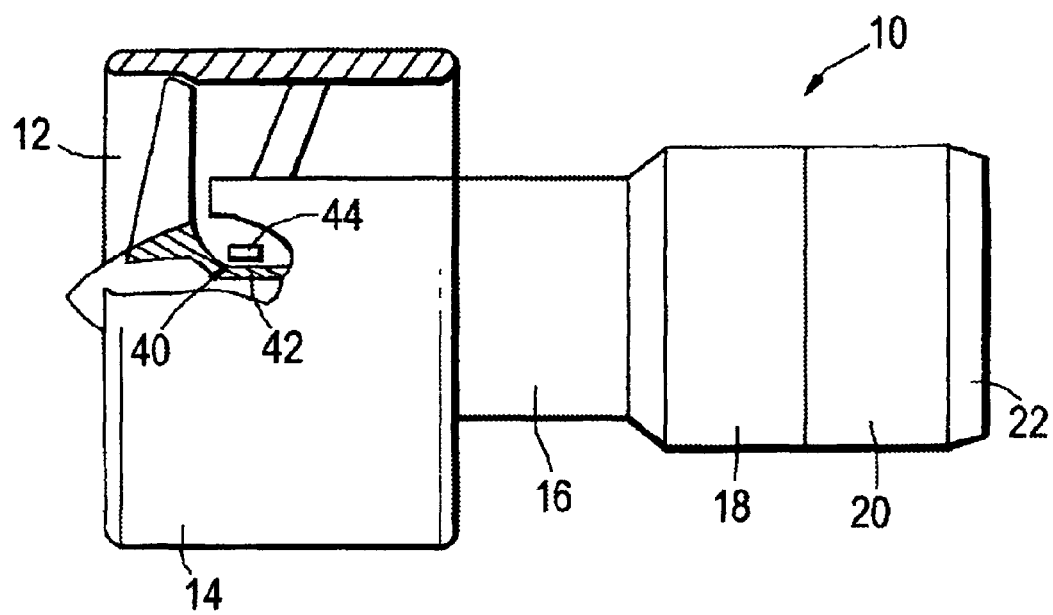
FIG. 1 is a part cross-sectional view of a gas turbine having a fault tolerant electrical machine in accordance with the present invention.

FIG. 1 shows a gas turbine engine 10 comprising an intake 12, a fan section 14, a compressor section 16, a combustion section 18, a turbine section 20 and an exhaust 22. The turbine section 20 comprises for example a high pressure turbine, an intermediate pressure turbine and a low pressure turbine. The compressor section comprises for example an intermediate pressure compressor and a high pressure compressor and the fan section comprises a fan. The high pressure turbine is arranged to drive the high pressure compressor via a first shaft, the intermediate pressure turbine is arranged to drive the intermediate pressure compressor via a second shaft and the low pressure turbine is arranged to drive the fan via a third shaft. A fault tolerant electrical machine 40 in accordance with an embodiment of the present invention is embedded in the gas turbine engine 10.

Figure 2:
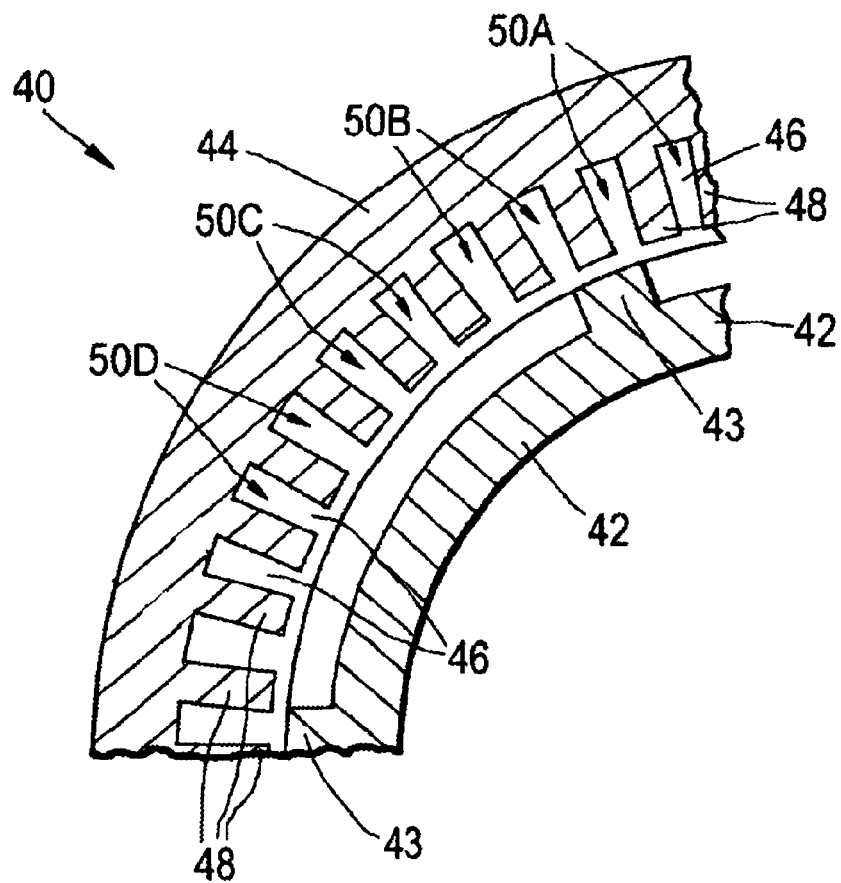
FIG. 2 is a part cross-sectional view of the fault tolerant electrical machine.

The fault tolerant electrical machine 40, as shown more clearly in FIG. 2, comprises a rotor 42 having a plurality of circumferentially spaced permanent magnets 43 on the periphery of the rotor 42 and a stator 44 having a plurality of electrical coils 46 arranged on radially inwardly extending teeth 48 on the stator 44. The coils 46 are arranged as a plurality of power generating phases. The rotor 42 of the fault tolerant electrical machine 40 is driven by the third shaft of the turbofan gas turbine engine 10 in this arrangement, but may equally well be driven by the second shaft or the first shaft of the turbofan gas turbine engine 10.

The fault tolerant electrical machine 40, in particular a permanent magnet electrical generator, comprises a plurality of identical phases 50A, 50B, 50C, 50D, etc, which are mechanically, magnetically, electrically and thermally isolated from each other such that a fault in any one of the phases does not affect any of the other phases.

The magnitude of the alternating voltage produced at the terminals of the fault tolerant electrical machine 40 changes with the speed of rotation of the rotor of the fault tolerant electrical machine 40, which itself is dependent on the speed of rotation of the rotor of the gas turbine engine 10. Also, changes in the source impedance causes added regulation effects as the electrical load changes. The multi-phase nature of such a permanent magnet electrical generator 40 means that the output phases have to be combined to enable the output power to be practically distributed to the electrical load centres.

Each phase 50A, 50B, 50C, 50D, etc, of the fault tolerant electrical machine 40 is provided with a respective one of a plurality of power electronic (PE) AC to DC converters (not shown). The combination of the power generator phases and the voltage regulation issues are accommodated using these power electronic AC to DC converters, which enable the systems to be combined at a common DC bus.

It is known that a single electrical phase provides electrical power, which pulses at a second harmonic frequency compared to the electrical frequency of the voltage and current.

Figure 3:
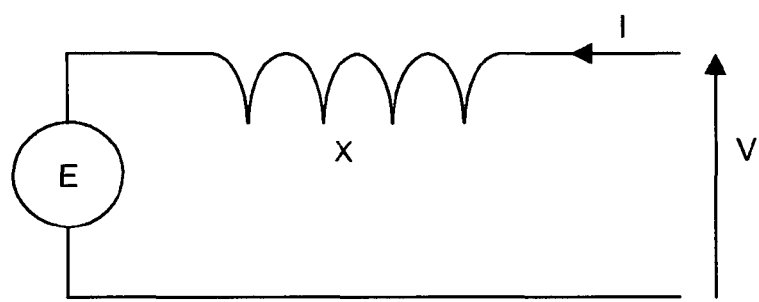
FIG. 3 is a representative circuit diagram of a phase of the fault tolerant electrical machine ignoring resistance.

As shown in FIG. 3, each phase can be modelled by a circuit having an alternating current (AC) terminal voltage V, a reactance X, and an AC voltage E through which flows an AC current I. For simplicity, the resistance R of the phase is ignored in the foregoing analysis since this is usually comparably small.

The voltage V is that imposed by the power electronic converter on the phase terminals and the voltage E represents the back electromotive force (e.m.f.) created by the rotation of the rotor 42. Therefore the instantaneous power supplied by the PE converter is given by the product VI and the instantaneous mechanical power supplied to the load is given by the product EI.

The e.m.f. E and current I are both essentially sinusoidal and therefore are given by $E \cdot \sin(\omega t)$ and $I \cdot \sin(\omega t + \phi)$ respectively, where E and I are the amplitudes of the e.m.f. and current, $\omega$ is the angular frequency, t is time and $\phi$ is the phase angle between the e.m.f. E and the current I.

The instantaneous mechanical power is therefore given by:

$$P = E \cdot \sin(\omega t) \cdot I \cdot \sin(\omega t + \phi) = 0.5 E \cdot I [\cos(\phi) - \cos(2\omega t + \phi)] \quad (1)$$

It is clear from equation 1 that the power has a time-dependent term $0.5 E \cdot I \cos(2\omega t + \phi)$ and a time-independent term $0.5 E \cdot I \cos(\phi)$. Consequently, a single phase exhibits mechanical torque ripple, which, as described previously, is undesirable.

The fault tolerant electrical machine 40 is optimised for its normal operating condition, i.e. no fault, so as to prevent such a ripple. For example the fault tolerant electrical machine 40 has four phases 50A, 50B, 50C and 50D and the e.m.fs of the phases are equally spaced in time such that they are separated by 90 electrical degrees. This is fixed in the design of the fault tolerant electrical machine 40. In general for a fault tolerant electrical machine 40 with m phases, the phases are arranged at 360/m electrical degrees apart and the second harmonic power angles of the m phases are separated by angles of 2×360/m electrical degrees in an un-faulted operation (i.e. 180° here). Thus, from equation 1, when all the phases operate at the same phase angle $\phi$ (i.e. balanced operation), the power P for the fault tolerant electrical machine 40 is:

$$P = P_A + P_B + P_C + P_D \quad (2)$$

$$P = 0.5E \cdot I[\cos(\varphi) - \cos(2\omega t + \varphi + (0 \times 180°))] +$$
$$0.5E \cdot I[\cos(\varphi) - \cos(2\omega t + \varphi + (1 \times 180°))] +$$
$$0.5E \cdot I[\cos(\varphi) - \cos(2\omega t + \varphi + (2 \times 180°))] +$$
$$0.5E \cdot I[\cos(\varphi) - \cos(2\omega t + \varphi + (3 \times 180°))]$$

In equation 2, the $\cos(2\omega t + \phi + (m \times 180°))$ terms sum to zero, leaving just the time-independent terms $0.5 E \cdot I \cos(\phi)$. These sum to give a power of $P = 2 E \cdot I \cos(\phi)$, and therefore the power is independent of time and does not exhibit mechanical torque ripple.

It will be appreciated that a similar analysis could be applied to the terminal voltage V to show that the instantaneous power supplied by the PE converter is also time independent. Thus a balanced, unfaulted machine does not exhibit electrical or mechanical ripple.

However, when a short-circuit is experienced within a phase this result is lost. For example, if a short circuit occurs at the terminals in phase 50A, the phase $\phi$ of this phase becomes 90° as a result of the reactance X (ignoring resistance). Therefore equation 2 is modified, as shown below:

$$P_{SC_A} = P_A + P_B + P_C + P_D \quad (3)$$

$$P = 0.5E \cdot I[\cos(90°) - \cos(2\omega t + 90° + (0 \times 180°))] +$$
$$0.5E \cdot I[\cos(\varphi) - \cos(2\omega t + \varphi + (1 \times 180°))] +$$
$$0.5E \cdot I[\cos(\varphi) - \cos(2\omega t + \varphi + (2 \times 180°))] +$$
$$0.5E \cdot I[\cos(\varphi) - \cos(2\omega t + \varphi + (3 \times 180°))]$$

Since $\cos(90°) = 0$, the faulted phase, 50A, no longer contributes to the time-independent power. Furthermore, as a result of the $\cos(2\omega t + 90° + (0 \times 180°))$ term, the time-dependent terms in equation 3 no longer sum to zero. Therefore the power exhibits ripple during this fault condition.

The present invention overcomes this problem, by detecting the short-circuit in the phase and sacrificing another phase (sacrificed phase) by intentionally creating a short-circuit in the other phase. A phase having a time-dependent term which cancels that of the short-circuited phase is selected as the sacrificed phase.

To cancel the time-dependent term of phase 50A, the phase 50B is intentionally short-circuited so that its phase $\phi$ also becomes 90°. Therefore, equation (3) for these two phases becomes:

$$P_{SC_{AB}} = 0.5E \cdot I[\cos(90°) - \cos(2\omega t + 90° + (0 \times 180°))] + 0.5E \cdot I[\cos(90°) - \cos(2\omega t + 90° + (1 \times 180°))]$$

and since $\cos(90°) = 0$ $$\Rightarrow P_{SC_{AB}} = -0.5E \cdot I[\cos(2\omega t + 90°) + \cos(2\omega t + 90° + 180°)] \quad (4)$$

Clearly the cosine terms cancel one another since a cosine wave has a period of 360° and therefore a wave offset by an angle of 180° is the inverse of the wave. This can be shown using the trigonometric identity $\cos(x+y) = \cos x \cdot \cos y - \sin x \cdot \sin y$ on the $\cos(2\omega t + 90° + 180°)$ term in equation 4, by setting $x = 2\omega t + 90°$ and $y = 180°$, giving:

$$\cos(2\omega t + 90° + 180°) = \cos(2\omega t + 90°) \cdot \cos 180° - \sin(2\omega t + 90°) \cdot \sin 180°$$

and since cos 180°=−1 and sin 180°=0

$$\Rightarrow \cos(2\omega t+90°+180°)=-\cos(2\omega t+90°) \quad (5)$$

By substituting this result into equation 4, it can be shown that $P_{SC_{AB}}=0$. Therefore the time-dependent terms of the short-circuited phase and the sacrificial phase cancel one another and thus prevent ripple.

Similarly, it can be shown that the time-dependent terms of the remaining unfaulted phases cancel one another:

$$P_{CD}=0.5E\cdot I[\cos(\phi)-\cos(2\omega t+\phi+(2\times180°))]+0.5E\cdot I[\cos(\phi)-\cos(2\omega t+\phi+(3\times180°))]$$

Since a cosine wave has period of 360°, θ+360°=θ:

$$\Rightarrow P_{CD}=0.5E\cdot I[\cos(\phi)-\cos(2\omega t+\phi)]+0.5E\cdot I[\cos(\phi)-\cos(2\omega t+\phi+180°)] \quad (6)$$

The time-dependent terms have the same form as those in equation 4 above, and thus the same analysis can be applied as was carried out in equation 5 to show that the time-dependent terms cancel one another.

$$\Rightarrow P_{CD}=0.5E\cdot I\cos(\phi)+0.5E\cdot I\cos(\phi)=E\cdot I\cos\phi \quad (7)$$

The net power from the fault tolerant electrical machine 40 under this fault condition is therefore:

$$P_{SC}=P_{SC_{AB}}+P_{CD}=0+E\cdot I\cos\phi=E\cdot I\cos\phi \quad (8)$$

As required, the net mechanical power, and therefore, torque are entirely time-independent and thus do not exhibit ripple.

It will be appreciated that a similar analysis could be applied to the terminal voltage V to show that the instantaneous electrical power supplied by the PE converter is also time independent. The fault tolerant electrical machine of the present invention therefore does not exhibit electrical ripple even during a fault, and thus allows the energy storage devices to be minimised.

It will be evident to the skilled person that the sacrificial phase described in the above embodiment could alternatively be phase 50D, which would provide the same resulting time-independent power. Furthermore, if the initial short-circuit occurred in another of the phases 50A-D, the sacrificial phase would be selected so as to cancel the time-dependent terms of the short-circuited phase.

The present invention has been described in relation to a fault tolerant machine 40 having four phases 50A-D, however this need not be the case. The fault tolerant machine 40 may comprise additional phases, for example six or eight phases. In this case, when there are short-circuits in more than one phase, a corresponding number of other phases may be sacrificed. This enables the machine to prevent ripple whilst still providing power. Preferably, the machine is a 4n-phase machine where n is an integer. However, the present invention can be applied to fault tolerant electrical machines having any number of phases, including odd-numbers of phases. What is required is that the time-dependent terms of the short-circuited phase and the sacrificed phase or phases cancel one another and that the remaining phases provide net power which is time-independent. This will occur if the angles in the cos(2ωt . . . ) terms of the short-circuited phase and the sacrificial phase or phases are evenly distributed around 360° (i.e. separated by a constant angle) and that the cos(2ωt . . . ) of the remaining (unfaulted) phases are also evenly distributed around 360°. However, the constant angle of the remaining phases need not be the same as for the short-circuited and sacrificial phases.

A time-independent power could also be achieved by using different numbers of phases. For example a short-circuited phase could be offset by sacrificing two or more phases, provided that the time-dependent terms of the remaining phases cancel one another.

The present invention is applicable to any fault tolerant electrical machine and particularly to a synchronous electrical machine which has a plurality of independent phases, and each independent phase has its own independent power electronic converter and provided the phases are balanced and equally spaced in time pre-fault.

Although the present invention has been described with reference to a permanent magnet synchronous electrical machine the present invention is also applicable to a synchronous reluctance electrical machine or other types of electrical machine. The present invention is applicable to any topology of synchronous electrical machine, e.g. axial flux electrical machines.

The present invention may be used in any motor and/or generator, but has particular application to aerospace gas turbine engines e.g. turbojet, turbopropeller or turboshaft gas turbine engines and also to marine and industrial gas turbine engines.

Although the present invention has been described with reference to a three shaft gas turbine engine it is equally applicable to a two shaft gas turbine engine or a single shaft gas turbine engine.

Although the present invention has been described with reference to the fault tolerant electrical machine being embedded in the gas turbine engine it is equally possible to apply the present invention to fault tolerant electrical machines at other positions on the gas turbine engine or in other non-gas turbine applications.

The invention claimed is:

1. A fault tolerant electrical machine comprising:
   a plurality of independent phases; and
   a detector arranged to detect a fault in at least one of the phases;
   wherein a controller is arranged to intentionally cause a fault in at least one other of the phases such that the vector sum of the second harmonic power vectors of the remaining phases is zero.

2. A fault tolerant electrical machine as claimed in claim 1, wherein the fault is a short-circuit.

3. A fault tolerant electrical machine as claimed in claim 1, wherein the controller comprises a plurality of converters, each phase having a respective converter.

4. A fault tolerant electrical machine as claimed in claim 1, wherein the machine is a motor/generator.

5. A fault tolerant electrical machine as claimed in claim 4, wherein the machine is a starter/generator.

6. A fault tolerant electrical machine as claimed in claim 1, wherein the machine is a synchronous electrical machine.

7. A fault tolerant electrical machine as claimed in claim 1, wherein the machine comprises a permanent magnet electrical machine.

8. A fault tolerant electrical machine as claimed in claim 1, wherein the machine comprises a reluctance electrical machine.

9. A fault tolerant electrical machine as claimed in claim 1, wherein the machine comprises a axial flux electrical machine.

10. A fault tolerant electrical machine as claimed in claim 1, wherein the plurality of phases comprises an even number of phases.

11. A fault tolerant electrical machine as claimed in claim 10, wherein the even number of phases is a multiple of 4.

12. A fault tolerant electrical machine as claimed in claim 10, wherein the even number of phases is 4.

13. A fault tolerant electrical machine as claimed in claim 1, wherein the plurality of phases comprises an odd number of phases.

14. A fault tolerant electrical machine as claimed in claim 1, wherein the angles of the remaining phases are evenly distributed around 360° and wherein the angles of the phases in which the fault is detected and in which the fault is intentionally created are evenly distributed around 360°.

15. A gas turbine engine comprising a fault tolerant electrical machine as claimed in claim 1.

16. A method of operating a fault tolerant electrical machine comprising a plurality of independent phases, the method comprising:
   detecting a fault in at least one of the phases; and
   intentionally causing a fault in at least one other of the phases such that the vector sum of the second harmonic power vectors of the remaining phases is zero.

17. A method of operating a fault tolerant electrical machine comprising a plurality of independent phases, the method comprising:
   detecting a fault in at least one of the phases; and
   intentionally sacrificing at least one other of the phases such that the vector sum of the second harmonic power vectors of the remaining phases is zero.

18. A method as claimed in claim 17, further comprising intentionally creating a fault in the at least one of the other phases.

19. A method as claimed in claim 18, further comprising intentionally creating a short-circuit in the at least one of the other phases.

20. A method as claimed in claim 17, wherein each of the phases has a time-dependent term, the method further comprising selecting at least one of the other phases which has a time-dependent term which cancels the time-dependent term of the phase having a fault as the sacrificed phase.

* * * * *